United States Patent
Kim et al.

(10) Patent No.: US 8,641,115 B2
(45) Date of Patent: Feb. 4, 2014

(54) UNDER-ACTUATED ROBOTIC FINGER WITH JOINT LOCKING MECHANISM

(71) Applicant: Korea Advanced Institute of Science and Technology, Daejeon (KR)

(72) Inventors: Kyungsoo Kim, Daejeon (KR); Keunho Rew, Asan (KR); Youngjune Shin, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/630,914

(22) Filed: Sep. 28, 2012

(65) Prior Publication Data
US 2014/0008931 A1   Jan. 9, 2014

(30) Foreign Application Priority Data
Jul. 4, 2012  (KR) .................. 10-2012-0072734

(51) Int. Cl.
*B25J 15/08*  (2006.01)
(52) U.S. Cl.
USPC .............................. 294/106; 294/111; 901/39
(58) Field of Classification Search
USPC ................. 294/111, 106, 198, 200, 213; 901/36–39; 623/63, 64
See application file for complete search history.

(56) References Cited

U.S. PATENT DOCUMENTS

| | | | | |
|---|---|---|---|---|
| 3,345,647 | A * | 10/1967 | Gentiluomo | 623/64 |
| 4,821,594 | A * | 4/1989 | Rosheim et al. | 74/490.05 |
| 7,077,446 | B2 * | 7/2006 | Kameda et al. | 294/106 |
| 7,168,748 | B2 * | 1/2007 | Townsend et al. | 294/106 |
| 7,556,299 | B2 * | 7/2009 | Koyama | 294/106 |
| 2008/0023974 | A1 * | 1/2008 | Park et al. | 294/106 |

FOREIGN PATENT DOCUMENTS

| | | |
|---|---|---|
| JP | 2006-116667 A | 5/2006 |
| KR | 10-2003-0039040 A | 5/2003 |
| KR | 10-0767721 B1 | 10/2007 |
| KR | 10-2011-0001125 A | 1/2011 |

OTHER PUBLICATIONS

Wang, L. et al., "A highly-underactuated robotic hand with force and joint angle sensors," 2011 IEEE/RSJ Int'l Conference on Intelligent Robots and Systems, San Francisco, CA (Sep. 2011).

* cited by examiner

*Primary Examiner* — Dean Kramer
(74) *Attorney, Agent, or Firm* — Edwards Wildman Palmer LLP

(57) ABSTRACT

The present invention relates to an under-actuated robotic finger with joint locking mechanisms, including: a base body; a first finger part coupled rotatably to the base body; a second finger part coupled rotatably to the first finger part; a first hinge part adapted to rotatably connect the base body and the first finger part; a second hinge part adapted to rotatably connect the first finger part and the second finger part; a first locking mechanism adapted to restrict the rotation of the first finger part; and a second locking mechanism adapted to restrict the rotation of the second finger part.

4 Claims, 5 Drawing Sheets

(a)

(b)

(a)

(a)

(b)

UNDER-ACTUATED ROBOTIC FINGER WITH JOINT LOCKING MECHANISM

CROSS-REFERENCE TO RELATED APPLICATIONS

This application claims the priority to Korean Patent Application No. 10-2012-0072734 filed on Jul. 4, 2012, which application is incorporated herein by reference.

BACKGROUND

1. Technical Field

The present invention relates to a robotic finger, and more particularly, to an under-actuated robotic finger with joint locking mechanisms.

2. Related Art

Generally, a robotic hand is utilized in various fields such as industrial, medical, military, and aerospace fields. Usually, each of robotic fingers constituting the robotic hand makes use of several motors to take the motions of multiple joints like human fingers.

So as to reduce the weight of the robotic hand, an under-actuated mechanism having a higher degree of freedom than the number of motors, can be applied to the robotic hand.

One example of the under-actuated mechanism of the prior art has been disclosed in the paper "A highly under-actuated robotic hand with force and joint angle sensors" published in 2011 IEEE/RSJ International Conference on Intelligence Robots and Systems held in San Francisco of U.S.A. on Sep. 25-30, 2011.

The robotic hand of the prior art is capable of strongly grasping an item, but fails to precisely grasping the item.

SUMMARY

Accordingly, the present invention has been made in view of the above-mentioned problems occurring in the prior art, and it is an object of the present invention to provide an under-actuated robotic finger with joint locking mechanisms that is capable of restricting the motion of a given joint, thereby achieving various operations.

To accomplish the above object, according to the present invention, there is provided an under-actuated robotic finger with joint locking mechanisms, including: a base body; a first finger part coupled rotatably to the base body; a second finger part coupled rotatably to the first finger part; a first hinge part adapted to rotatably connect the base body and the first finger part; a second hinge part adapted to rotatably connect the first finger part and the second finger part; a first locking mechanism having a first toothed part, a first locker adapted to be engaged with the first toothed part to restrict the rotation of the first finger part, and a first locker-operating part adapted to operate the first locker; and a second locking mechanism having a second toothed part, a second locker adapted to be engaged with the second toothed part to restrict the rotation of the second finger part, and a second locker-operating part adapted to operate the second locker.

According to the present invention, preferably, one of the first toothed part and the first locker is provided on the base body, and the other thereof is being on the first finger Further, one of the second toothed part and the second locker is provided on the first finger part, while the other thereof is being on the second finger part.

According to the present invention, preferably, each of the first locker-operating part and the second locker-operating part includes an electromagnet and a switching member adapted to switch the first locker and the second locker between a first state and a second state as the electromagnet is turned on and off.

According to the present invention, preferably, each of the first locker and the second locker includes a first portion rotating around a hinge shaft, a second portion extended from the end of the first portion toward the first toothed part in such a manner as to be engaged with the first toothed part at the first state, and a slot portion formed in the middle of the first portion.

According to the present invention, preferably, the switching member includes: a body moving between the first state and the second state by means of the operation of the electromagnet; and a slider extended from the end of the body toward the slot portion in such a manner as to be guided within the slot portion.

According to the present invention, preferably, the first portion is extended spirally from the hinge shaft, so that each of the first locker and the second locker has compliance.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Hereinafter, an explanation on an under-actuated robotic finger with joint locking mechanisms according to the present invention will be in detail given with reference to the attached drawings.

Figure 1:
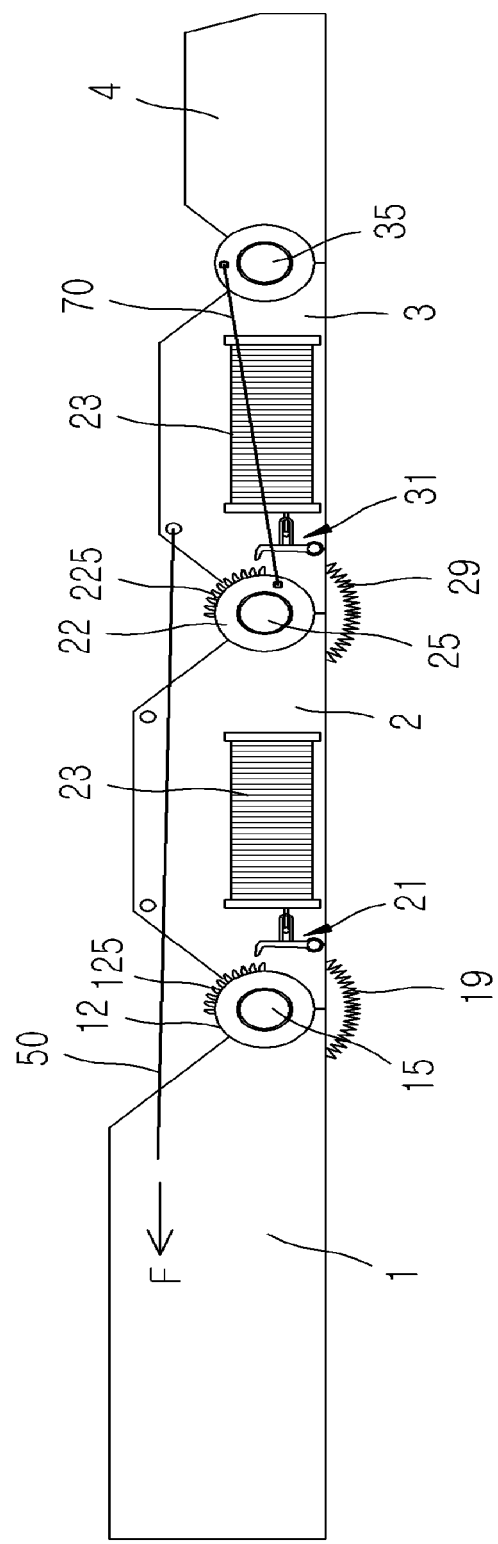
FIG. 1 shows the concept of an under-actuated robotic finger with joint locking mechanisms according to the present invention.
Figure 2:
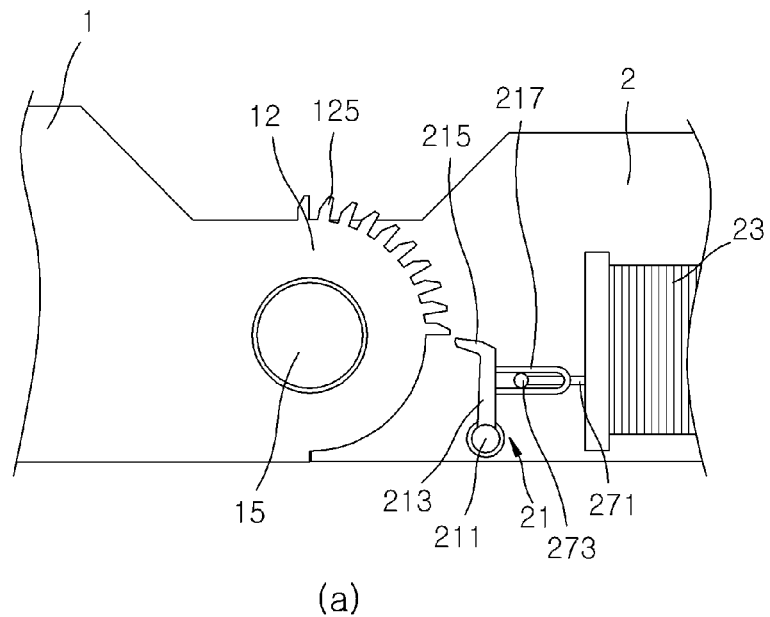
FIGS. 2a and 2b show one example of the joint locking mechanisms operated in the under-actuated robotic finger according to the present invention.
Figure 2:
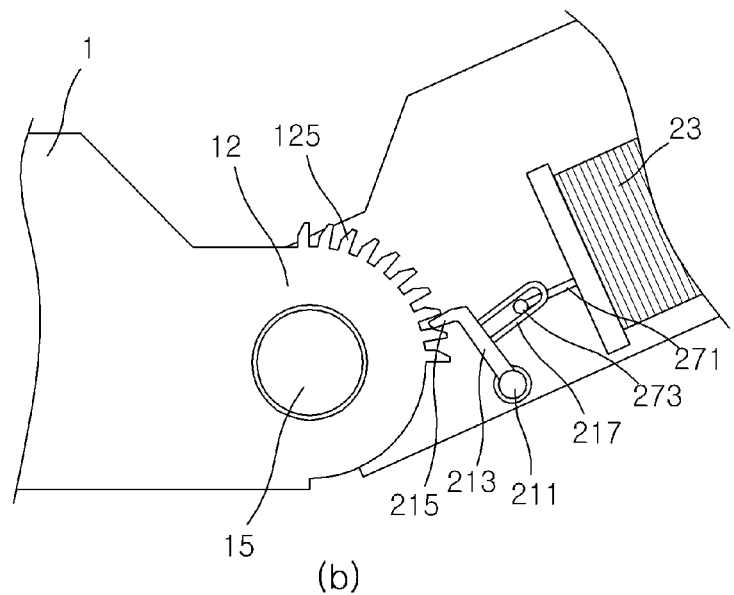

FIG. 1 shows the concept of an under-actuated robotic finger with joint locking mechanisms according to the present invention. In the description of the present invention, the robotic finger has three joints like human finger, but it should be clearly understood that the scope of this invention is not limited to the number of joints.

As shown in FIG. 1, the under-actuated robotic finger with joint locking mechanisms according to the present invention includes a base body 1, a first finger part 2 coupled rotatably to the base body 1, a second finger part 3 coupled rotatably to the first finger part 2, and a third finger part 4 coupled rotatably to the second finger part 3. The robotic finger according to the present invention, as the minimum constitution parts thereof, includes the base body 1, the first finger part 2, and the second finger part 3, except the third finger part 4. A first spring member 19 is connected between the base body 1 and the first finger part 2, and a second spring member 29 is between the first finger part 2 and the second finger part 3.

However, the first and second spring members 19 and 29 are the fundamental parts of the robotic finger according to the present invention.

In the description and drawings of the present invention, a string 50 is pulled by means of a motor and a pulley (not shown) to activate the robotic finger, but the scope of this invention is not limited to the actuating way of the robotic finger. That is, if the robotic finger is under-actuated, various actuating ways can be applied to the present invention.

The first finger part 2 is coupled rotatably to the base body 1 by means of a first hinge part 15, and the second finger part 3 is coupled rotatably to the first finger part 2 by means of a second hinge part 25.

The base body 1 is a part corresponding to the palm of human hand.

The robotic finger according to the present invention further includes a first locking mechanism and a second locking mechanism. The first locking mechanism is adapted to restrict the rotation of the first finger part 2 with respect to the base body 1 or to permit the rotation thereof, and the second locking mechanism is adapted to restrict the rotation of the second finger part 3 with respect to the first finger part 2 or to permit the rotation thereof.

The first locking mechanism includes a first toothed part 125, a first locker 21 adapted to be engaged with the first toothed part 125 to restrict the rotation of the first finger part 2, and a first locker-operating part adapted to operate the first locker 21. The first locker-operating part includes an electromagnet 23 and a switching member 27 (see FIGS. 5a and 5b).

The second locking mechanism has the same structure as the first locking mechanism, which includes a second toothed part 225, a second locker 31 adapted to be engaged with the second toothed part 225 to restrict the rotation of the second finger part 3, and a second locker-operating part adapted to operate the second locker 31. The second locker-operating part includes an electromagnet 23 and a switching member 27, like the first locker operating part.

One of the first toothed part 125 and the first locker 21 is provided on the base body 1, and the other thereof is on the first finger part 2. According to the attached drawings, the first toothed part 125 is provided on the base body 1, and the first locker 21 is on the first finger part 2. Of course, they can be provided on the opposite positions to the above-mentioned positions.

One of the second toothed part 225 and the second locker 31 is provided on the first finger part 2, and the other thereof is on the second finger part 3. According to the attached drawings, the second toothed part 225 is provided on the first finger part 2, and the second locker 31 is on the second finger part 3. Of course, they can be provided on the opposite positions to the above-mentioned positions.

The configurations of the first locker 21 and the second locker 31 are the same as each other, and therefore, an explanation on the configuration of the first locker 21 will be given alone, for the brevity of the description. Further, the configurations of the first locker-operating part and the second locker-operating part are the same as each other, and therefore, an explanation on the configuration of the first locker-operating part will be given alone, for the brevity of the description.

The first locker 21 includes a first portion 213 rotating around a hinge shaft 211, a second portion 215 extended from the end of the first portion 213 toward the first toothed part 125 in such a manner as to be engaged with the first toothed part 125 at a first state, and a slot portion 217 formed in the middle of the first portion 213.

According to the present invention, the first state means the state where rotation is restricted by means of the engagement of the first lockers 21 and 31 with the first and second toothed parts 125 and 225, and a second state means the state where the engagement is released to permit the rotation.

Figure 5:
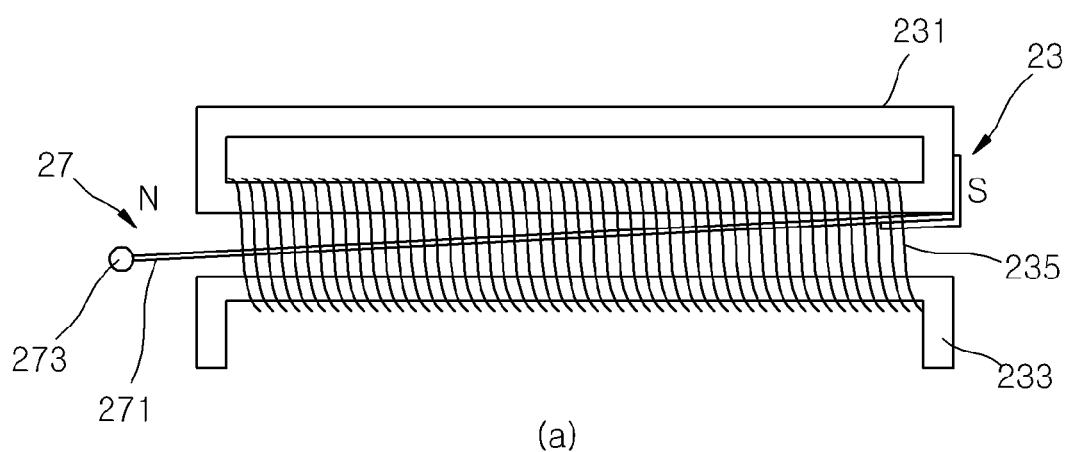
FIGS. 5a and 5b show the concept of a first locker-operating part in the under-actuated robotic finger according to the present invention.
Figure 5:
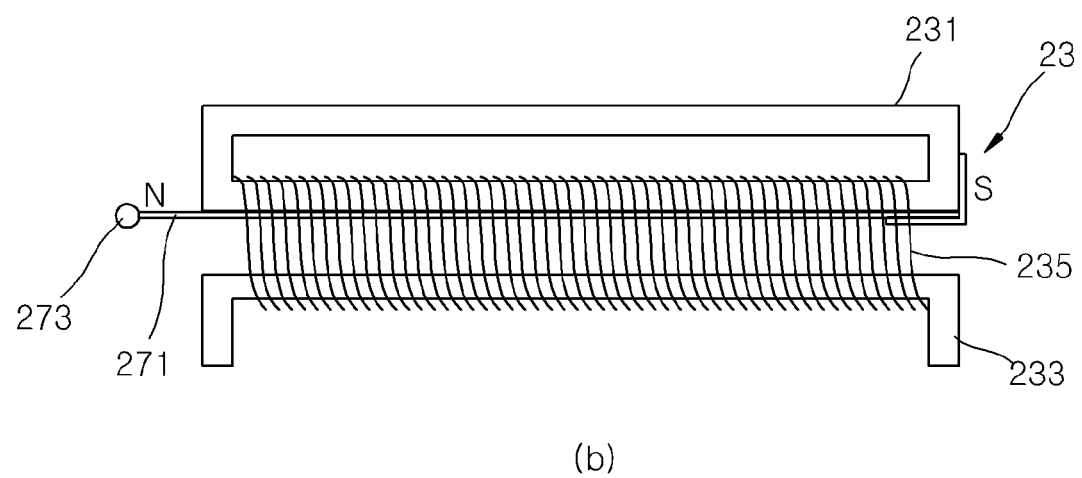

FIGS. 5a and 5b show the concept of the first locker-operating part in the under-actuated robotic finger according to the present invention. The electromagnet 23 is formed by winding an electric wire 235 on an iron core 231, and a plastic member 233 serves as a support for the electric wire 231. The switching member 27 includes: a body 271 moving between the first state and the second state by means of the operation of the electromagnet 23; and a slider 273 extended from the end of the body 271 toward the slot portion 217 in such a manner as to be guided within the slot portion 217.

Figure 3:
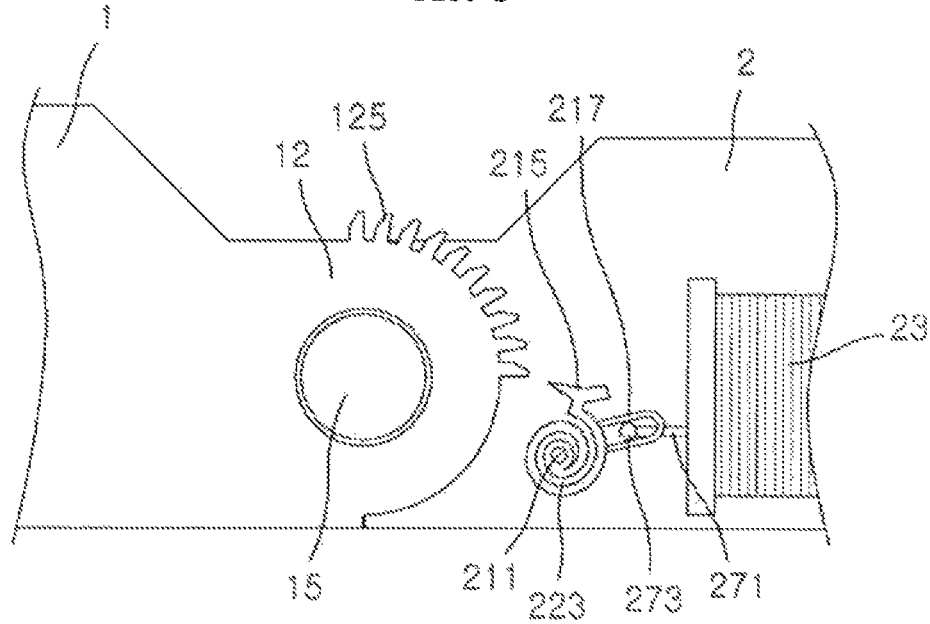
FIGS. 3a and 3b show another example of the joint locking mechanisms operated in the under-actuated robotic finger according to the present invention.
Figure 3:
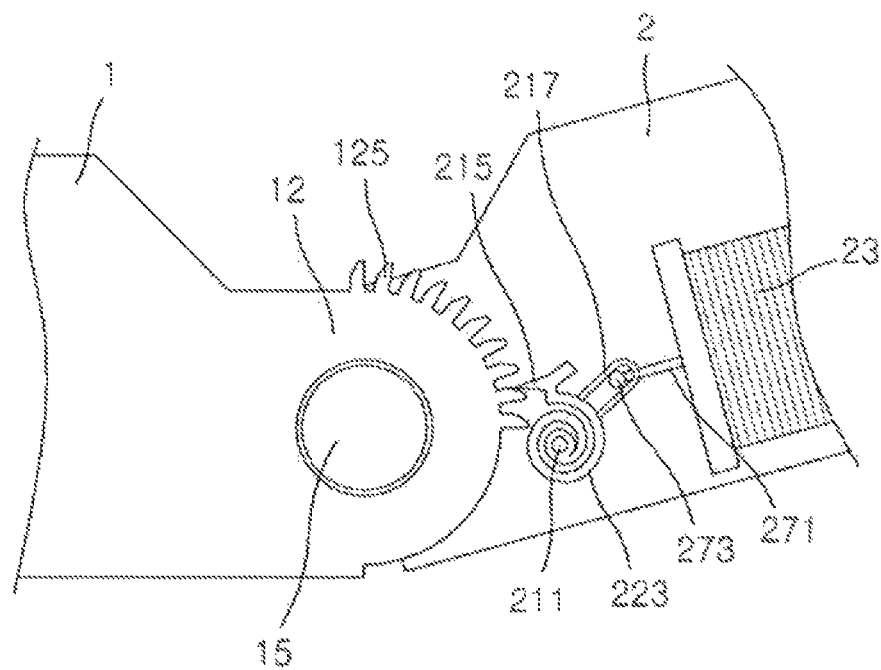

FIGS. 3a and 3b show another example of the joint locking mechanisms operated in the under-actuated robotic finger according to the present invention. In this case, the first and second lockers 21 and 31 are rotatable with respect to the hinge shafts 211 in the same manner as above, but the portion extended from the hinge shaft 211, that is, a third portion 223 corresponding to the first portion 213 is extended spirally from the hinge shaft 211. Compliance is provided by the third portion 223 extending spirally.

Next, an operation of the robotic finger according to the present invention will be described. Referring to FIGS. 2a to 3b, the operations of the first locker 21 to the first and second states will be explained, which is the same as those of the second locker 31.

In the first state shown in FIG. 2a, if the electromagnet 23 is turned on, electric current is applied to the electric wire 235 to cause a magnetic field, so that the switching member 27 is moved to the iron core 231 and attaches thereto, as shown in FIG. 5b. Next, the slider 273 is guided in the slot portion 217 to rotate the first portion 213 of the first locker 21 counter-clockwisely, as shown in FIG. 2b. After that, the second portion 215 is engaged with the first toothed part 125 to restrict the rotation of the first finger part 2 with respect to the base body 1. The first state can be obtained from the state where the first finger part 2 is not rotated with respect to the base body 1 at all, as shown in FIG. 2a, or from the state where the first finger part 2 is rotated with respect to the base body 1, as shown in FIG. 2b. In the embodiments of the first locker 21 as shown in FIGS. 3a and 3b, the first and second states are also obtained in accordance with the operations of the electromagnet 23. Since the first locker 21 has compliance, if an additional torque is applied to the first locker 21 after the first locker 21 has been in the first state, the first locker 21 is compressed to permit the first finger 2 to slightly further rotate.

Figure 4:
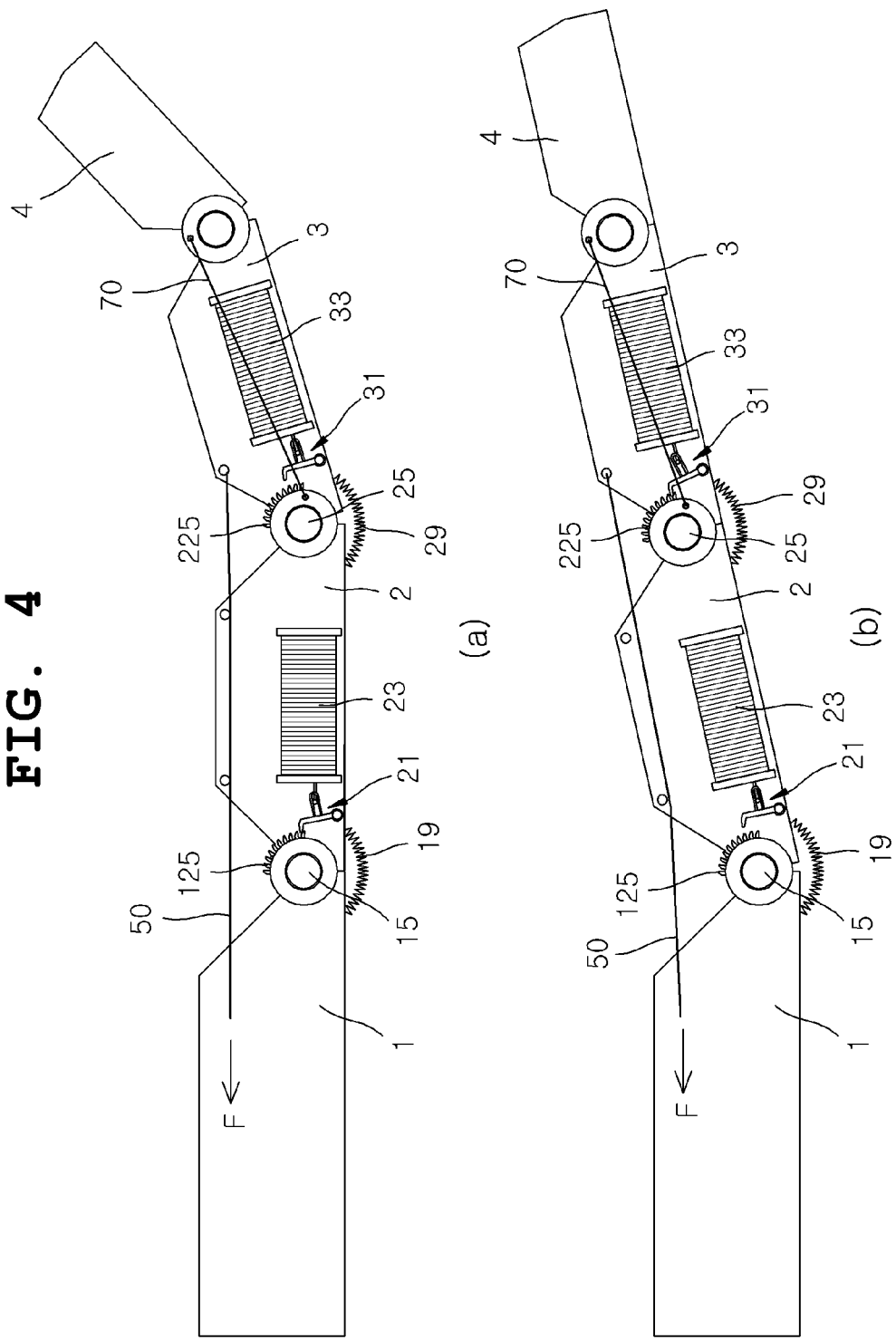
FIGS. 4a and 4b show the operating states of the under-actuated robotic finger according to the present invention.

FIGS. 4a and 4b show the operating states of the under-actuated robotic finger according to the present invention.

In FIG. 4a, the first locker 21 becomes in the first state to restrict the rotation of the first finger part 2 with respect to the base body 1, and the second locker 31 is in the second state. In this state, just the second finger part 3 is rotatable with respect to the first finger part 2, thereby obtaining the operations of the first and second finger parts 2 and 3 as shown in FIG. 4a.

In FIG. 4b, the second locker 31 becomes in the first state to restrict the rotation of the second finger part 3 with respect to the first finger part 2, and the first locker 21 is in the second state. In this state, just the first finger part 2 is rotatable with respect to the base body 1, thereby obtaining the operations of the first and second finger parts 2 and 3 as shown in FIG. 4b.

As set forth in the foregoing, the under-actuated robotic finger with the joint locking mechanisms according to the present invention has the effects capable of operating the first finger part 2 and the second finger part 3 independently of each other in a substantially sophisticated manner.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An under-actuated robotic finger with joint locking mechanisms, comprising:
    a base body;
    a first finger part coupled rotatably to the base body;
    a second finger part coupled rotatably to the first finger part;
    a first hinge part adapted to rotatably connect the base body and the first finger part;
    a second hinge part adapted to rotatably connect the first finger part and the second finger part;
    a first locking mechanism having a first toothed part, a first locker adapted to be engaged with the first toothed part to restrict the rotation of the first finger part, and a first locker-operating part adapted to operate the first locker; and
    a second locking mechanism having a second toothed part, a second locker adapted to be engaged with the second toothed part to restrict the rotation of the second finger part, and a second locker-operating part adapted to operate the second locker,
    wherein each of the first locker-operating part and the second locker-operating part comprises an electromagnet and a switching member adapted to switch the first locker and the second locker to a first state and a second state as the electromagnet is turned on and off.

2. The under-actuated robotic finger according to claim 1, wherein each of the first locker and the second locker comprises a first portion rotating around a hinge shaft; a second portion extended from the end of the first portion toward the first toothed part in such a manner as to be engaged with the first toothed part at the first state; and a slot portion formed in the middle of the first portion, and
    wherein the switching member comprises a body moving between the first state and the second state by means of the operation of the electromagnet; and a slider extended from the end of the body toward the slot portion in such a manner as to be guided within the slot portion.

3. The under-actuated robotic finger according to claim 2, wherein the first portion is extended spirally from the hinge shaft.

4. The under-actuated robotic finger according to claim 1, wherein one of the first toothed part and the first locker is provided on the base body, while the other thereof is being on the first finger part, and one of the second toothed part and the second locker is provided on the first finger part, while the other thereof is being on the second finger part.

* * * * *